United States Patent
Tsuji et al.

[11] Patent Number: 5,885,052
[45] Date of Patent: Mar. 23, 1999

[54] TRANSFERRING APPARATUS AND ROBOT ARM

[75] Inventors: Kazuhiko Tsuji; Yasuaki Murakami; Eisaku Takinami; Masaharu Suzuki, all of Kariya, Japan

[73] Assignee: Kabushiki Kaisha Toyoda Jidoshokki Seisakusho, Kariya, Japan

[21] Appl. No.: 866,447

[22] Filed: May 30, 1997

[30] Foreign Application Priority Data

Jun. 3, 1996 [JP] Japan ..................................... 8-140108

[51] Int. Cl.⁶ ......................................................... B25J 18/04
[52] U.S. Cl. ........................... 414/744.6; 901/15; 901/21; 74/490.04
[58] Field of Search .............................. 414/744.6, 744.5, 414/744.4, 744.3, 749; 901/15, 21, 23; 74/490.04, 490.01, 490.03

[56] References Cited

U.S. PATENT DOCUMENTS

| | | | |
|---|---|---|---|
| 4,951,601 | 8/1990 | Maydan et al. | 118/719 |
| 5,151,008 | 9/1992 | Ishida et al. | 414/744.5 |
| 5,333,986 | 8/1994 | Mizukami et al. | 414/744.6 X |
| 5,431,529 | 7/1995 | Eastman et al. | 414/744 |

FOREIGN PATENT DOCUMENTS

| | | |
|---|---|---|
| 63-252439 | 10/1988 | Japan. |
| 7507010 | 8/1994 | Japan. |
| 08039463 | 2/1996 | Japan. |

*Primary Examiner*—Donald W. Underwood
*Attorney, Agent, or Firm*—Morgan & Finnegan, L.L.P.

[57] ABSTRACT

A robot arm and an apparatus for transferring an article. The robot arm includes a movable hand for holding the article. A first arm has a proximal end that rotatably supports a drive pulley and a distal end that rotatably supports a driven pulley. The pulleys are connected to each other by a belt. A second arm and a third arm each have a proximal end and a distal end. The proximal ends of the second and third arms are pivotally supported by the driven pulley. The distal ends of the second and third arms are pivotally coupled to the hand. The driven pulley, the second arm, and the third arm cooperate with the hand to define a parallel linkage mechanism. A first motor pivots the first arm about its proximal end. A second motor rotates the drive pulley. A pivoting mechanism pivots the second arm about its proximal end relative to the first arm in correspondence with the pivoting of the first arm.

17 Claims, 9 Drawing Sheets

TRANSFERRING APPARATUS AND ROBOT ARM

BACKGROUND OF THE INVENTION

The present invention relates to transferring apparatuses and robot arms, and more particularly to transferring apparatuses and robot arms for transferring semiconductor wafers and liquid crystal substrates.

Generally, semiconductor devices are produced from semiconductor wafers by sequentially sending each wafer into a plurality of chambers that are maintained in high temperature and high vacuum states. The semiconductor wafers are first stocked at a loading station and then sent to a preparing chamber. From the preparing chamber, the wafers are sent to each processing chamber. A transferring apparatus provided with a robot arm is used to transfer the wafers between the loading station and the preparing chamber, between the preparing chamber and the processing chambers, and between the processing chambers. Such transferring apparatus must have superior heat resistance characteristics and must be capable of preventing dust from arising.

Belt drive type robot arms and linkage type robot arms are known in the prior art. A typical belt drive type robot arm is provided with a hand to carry wafers and a motor to move the hand along a certain plane. Such a robot arm employs a belt drive mechanism that includes a plurality of belts and arms to transmit the drive force of the motor to the hand.

The drive mechanism includes a first arm, the proximal end of which is connected to the motor's output shaft, or first rotary shaft. The proximal end of a second arm is rotatably connected to the distal end of the first arm by means of a second rotary shaft. The hand is connected to the distal end of the second arm by means of a third rotary shaft.

The drive force of the motor is transmitted to the hand by way of a drive pulley, which is coupled to the first rotary shaft, two intermediate pulleys, which are coupled to the second rotary shaft, a driven pulley, which is coupled to the third rotary shaft, and two belts, which connect the pulleys. The rotation of the motor output shaft causes the hand to move along a certain plane. The movement of the hand allows the wafers to be transferred.

This type of robot arm is provided with a magnetic fluid seal that is attached to the vicinity of the proximal end of the hand. The seal prevents dust, which arises from the bearing of each pulley during rotation of the pulley, from entering the chambers. However, the seal has a tendency to deteriorate due to exposure to the heat of the chambers. Progressive deterioration increases the amount of dust that arises. This is inefficient since it is necessary to frequently exchange the seal.

The arms of the robot arm extend and contract to transfer the wafers. During contraction, the arms overlap one another. Accordingly, the opening of each chamber must be large enough to accommodate the overlapping arms and the wafers. Large openings are disadvantageous since the environment in each chamber must be maintained in a high temperature and high vacuum state.

Japanese National Phase Patent Publication No. 7-507010 (WO 94/14581) describes a joint arm, which is a typical linkage type robot arm. The joint arm includes a shoulder portion, an elbow portion, and a wrist portion. A pair of upper arms (corresponding to the first arms of the above robot arm) are arranged rotatably about the shoulder portion. A pair of lower arms (corresponding to the second arms of the above robot arm) are arranged rotatably about the wrist portion.

An intermediate link having a plurality of shafts connects the upper arms to the lower arms at the elbow portion.

The intermediate link has two S-shaped strips. The strips transmit the pivoting of the elbow portion of the upper arm to the corresponding elbow portion of the lower arm. An end effector (corresponding to the hand of the above robot arm) is attached to the wrist portion of the pair of upper arms. Among the two upper arms, only one is driven.

When one of the upper arms is pivoted about the elbow portion, the pivoting is transmitted to the end effector. This moves the end effector. Accordingly, semiconductor wafers are transferred by placing the wafers on the end effector.

However, the pair of upper arms and pair of lower arms in the prior art linkage type robot arm are formed from rigid and prism-like solid bodies. Furthermore, the upper arm and the lower arm are connected to each other by the intermediate link, which includes a plurality of shafts, and the S-shaped strips. This increases the weight of the arms and necessitates a strong driving force. The dimensional accuracy and rigidity of the shafts must also be enhanced to move the heavy arms smoothly. Furthermore, the S-shaped strips have a special shape and are not easily available. As a result, the manufacturing and assembling of the robot arm is burdensome. This increases the production cost of the robot arm.

SUMMARY OF THE INVENTION

Accordingly, it is an objective of the present invention to provide a robot arm and a transferring apparatus that is light, inexpensive, and does not create dust.

To achieve the above objective, the present invention provides an apparatus for transferring an article. The apparatus includes a movable hand for holding the article. A first arm has a proximal end and a distal end. The proximal end rotatably supports a rotatable drive member and the distal end rotatably supports a rotatable driven member. The drive member and the driven member are connected to each other by a power transmitting means such that the drive member drives the driven member. A second arm and a third arm each have a proximal end and a distal end. The proximal ends of the second and third arms are pivotally supported by the driven member. The distal ends of the second and third arms are pivotally coupled to the hand. The driven member, the second arm, and the third arm cooperate with said hand to define a parallel linkage mechanism. A first motor pivots the first arm about its proximal end. A second motor rotates the drive member. A pivoting mechanism pivots the second arm about its proximal end relatively to the first arm in correspondence with the pivoting of the first arm.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 3(*a*), 3(*b*) 3(*c*), and 3(*d*) are diagrammatic views showing the operation of the drive and driven pulleys of the apparatus of FIG. 1;

DETAILED DESCRIPTION OF THE PREFERRED EMBODIMENTS

A first embodiment of a semiconductor transferring apparatus employed in a semiconductor manufacturing apparatus will now be described.

Figure 1:
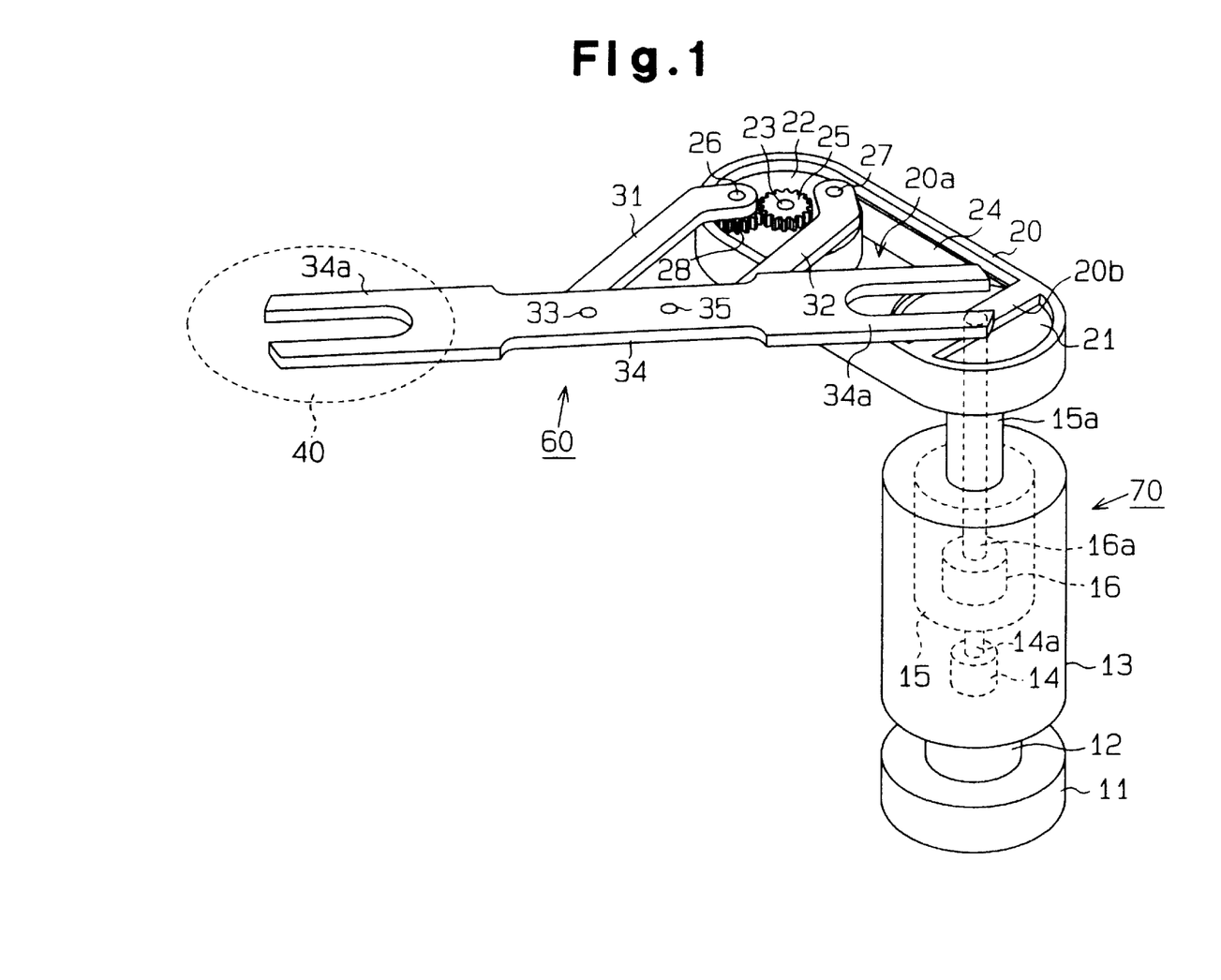
FIG. 1 is a perspective view showing a preferred embodiment of a transferring apparatus according to the present invention.

As shown in FIG. 1, a transferring apparatus is used to transfer semiconductor wafers 40 to chambers of a semiconductor manufacturing apparatus (not shown). The transferring apparatus includes a robot arm 60 and a drive mechanism 70, which drives the arm 60.

A first motor 11 is provided on a base (not shown) to lift and lower the robot arm 60. The first motor 11 includes a guide member 12. An outer case 13 is coupled to the guide member 12 and supported in a manner allowing vertical movement. A transmission mechanism, such as a conventional ball screw and nut, transmits the rotation of an output shaft (not shown) of the first motor 11 to the outer case 13. This lifts and lowers the outer case 13 along the guide member 12.

A second motor 14 is secured inside the outer case 13 to drive a pulley 21, which is provided in the robot arm 60. An output shaft 14a of the second motor 14 extends upward. The upper end of the output shaft 14a is fixed to the bottom surface of a cylindrical inner case 15. The output shaft 14a of the second motor 14 rotates in forward and reverse directions. This rotates the inner case 15 along with the output shaft 14a.

A cylinder 15a is mounted on the top surface of the inner case 15 so as to extend upward from the outer case 13. A third motor 16 is secured inside the inner case 15 to drive the robot arm 60. An output shaft 16a of the third motor 16 extends through and out of the cylinder 15a. The output shafts of the motors 11, 14, 16 are coaxial.

The robot arm 60 that is mounted on the drive mechanism 70 will now be described. A first arm 20 of the robot arm 60 is made of aluminum and has a track-like peripheral wall. An accommodating portion 20a is defined within the peripheral wall. A connecting plate 20b extends between the opposite upper surfaces of the peripheral wall.

The output shaft 16a of the third motor 16 is fixed to the connecting plate 20b of the first arm 20. The output shaft 16a of the third motor 16 rotates in forward and reverse directions. This rotates the first arm 20 along with the output shaft 16a.

A drive pulley 21 is accommodated in the accommodating portion 20a below the connecting bar 20b. The drive pulley 21 is fixed to the distal end of the cylinder 15a. The forward and reverse rotation of the output shaft 14a of the second motor 14 rotates the drive pulley 21 integrally with the inner case 15 and the cylinder 15a accordingly in the same direction. When the second motor 14 rotates the drive pulley 21, the body of the third motor 16 rotates together with the inner case 15 while the first arm 20 rotates together with the drive pulley 21.

Figure 2:
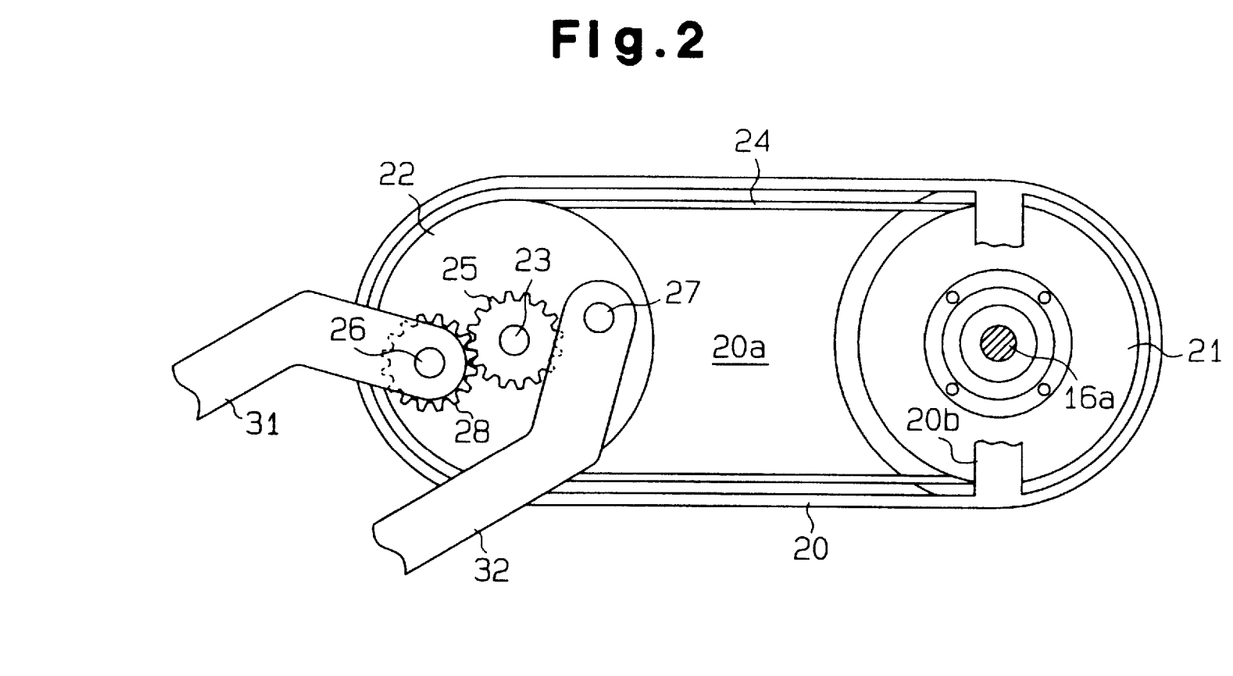
FIG. 2 is a plan view showing the first arm of the apparatus of FIG. 1.

As shown in FIG. 2, a driven pulley 22 is arranged in the accommodating portion 20a at the distal end of the first arm 20. A fixed shaft 23 fixed to the first arm 20 rotatably supports the driven pulley 22. The driven pulley 22 and the drive pulley 21 are connected to each other by a belt 24. Thus, when the second motor 14 rotates the drive pulley 21 in forward or rear directions, the belt 24 rotates the driven pulley 22 accordingly. The speed ratio between the drive pulley 21 and the driven pulley 22 is 1:1.

A drive gear, or sun gear 25, is fixed to the upper portion of the fixed shaft 23. Thus, the sun gear 25 remains in a fixed state regardless of the rotation of the driven pulley 22.

A first support shaft 26 and a second support shaft 27 is fixed to the top surface of the driven pulley 22 at positions located radially outward from the sun gear 25. The first and second support shafts 26, 27 are spaced equally from the axis of the sun gear 25 and intersect a line that intersects the axis of the shaft 23.

A planet gear 28, which meshes with the sun gear 25, is rotatably supported by the first support shaft 26. Thus, the planet gear 28 rotates about the first support shaft 26 when revolving about the sun gear 25. The gear ratio between the sun gear 25 and the planet gear 28 is 1:1.

A second arm, or drive arm 31, is coupled to the first support shaft 26 while a third arm, or driven arm 32 is coupled to the second support shaft 27. The proximal end of the drive arm 31 is rotatably supported by the first support shaft 26 and secured to the top surface of the planet gear 28. Thus, the rotation of the planet gear 28 causes the drive arm 31 to pivot integrally with the planet gear 28 about the first support shaft 26. A support shaft 33 pivotally couples the distal end of the drive arm 31 to a hand 34.

The proximal end of the driven arm 32 is pivotally supported by the second support shaft 27. A support shaft 35 pivotally couples the distal end of the driven arm 32 to the hand 34. Accordingly, a parallel linkage mechanism is defined by the driven pulley 22, the drive arm 31, the driven arm 32, and the hand 34. In the linkage mechanism, the drive arm 31 serves as the crank, the driven arm 32 serves as the lever, and the hand 34 serves as the joint. This structure enables the pivoting of the drive arm 31 to constantly translate the hand 34 parallel to a line segment that connects the first support shaft 26 with the second support shaft 27.

Figure 4A:
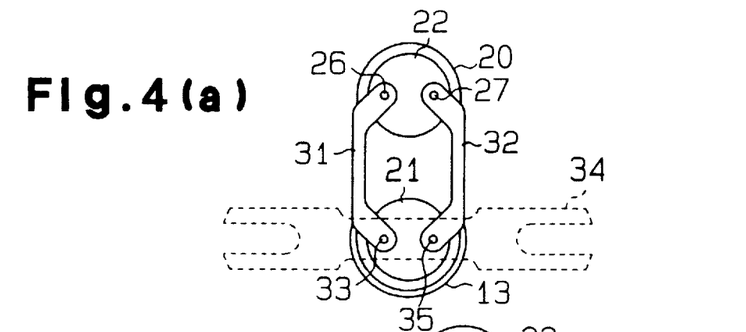
FIGS. 4(a), 4(b), 4(c), 4(d), and 4(e) are diagrammatic views showing the operation of various members of the apparatus of FIG. 1.
Figure 4B:
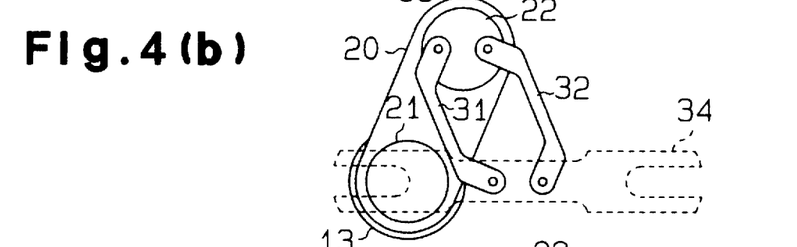
Figure 4C:
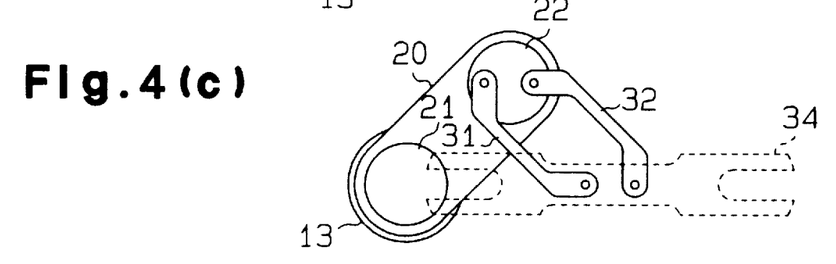
Figure 4D:
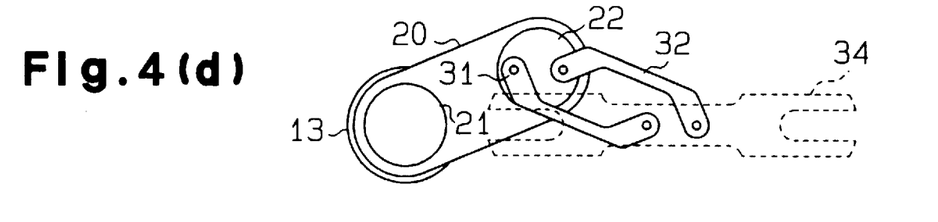

Each end of the hand 34 is bifurcated. A holding portion 34a is defined on each bifurcated end to hold the semiconductor wafers 40. The hand 34 is arranged perpendicular to the longitudinal axis of the first arm 20 when the drive and driven arms 31, 32 overlap the first arm 20, as shown in FIG. 4(a).

The operation of the above transferring apparatus will now be described with reference to FIGS. 3(a) to 3(d) and to FIGS. 4(a) to 4(e). FIG. 4(a) shows the hand 34 arranged perpendicular to the longitudinal axis of the first arm 20. From this state, the first arm 20 is rotated clockwise, as viewed in FIG. 4(a), by operating the first arm 20 as described below.

Figure 3A:
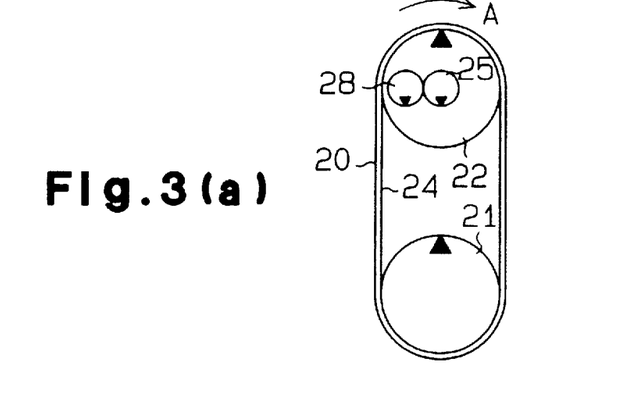
Figure 3B:
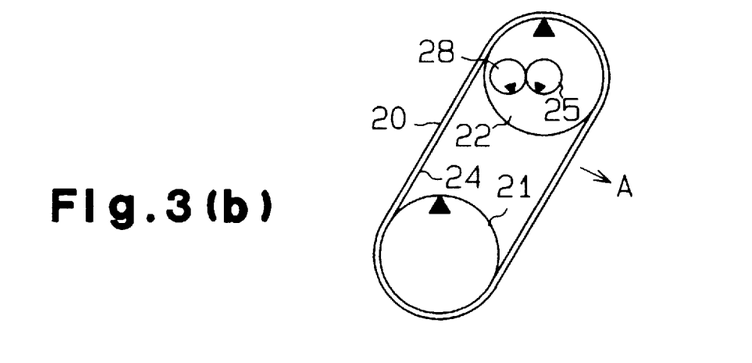
Figure 3C:
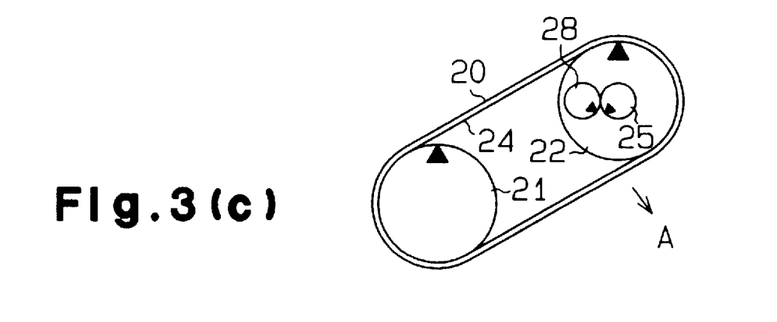
Figure 3D:
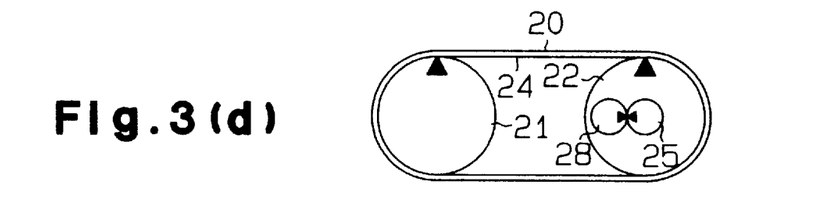

The first arm 20 is pivoted 90 degrees from the position shown in FIG. 3(a) to the position shown in FIG. 3(d) when driven by the third motor 16. During the movement of the first arm 20, the operation of the second motor 14 is stopped. This causes the drive pulley 21 to remain stationary with respect to outer case 13, as shown in FIGS. 3(a) to 3(d) (refer to the triangular mark on the drive pulley 21).

The belt 24 causes the driven pulley 22 to be rotated counterclockwise about the fixed shaft 23 when the rotation of the drive pulley 21 is stopped while the first arm 20 is rotated clockwise. Since the speed ratio between the drive pulley 21 and the driven pulley 22 is 1:1, the rotated angle of the driven pulley 22 corresponds with the pivot angle of the first arm 20.

Accordingly, a 90 degree pivot of the first arm 20 in a clockwise direction causes the driven pulley 22 to revolve 90 degrees about the drive pulley 21 in a clockwise direction while rotating 90 degrees about the fixed shaft 23 in a counterclockwise direction.

In addition, the sun gear 25 differs from the driven pulley 22 in that the gear 25 does not rotate about the fixed shaft 23 during pivoting of the first arm 20 since the gear 25 is fixed to the fixed shaft 23. Thus, the planet gear 28 follows the rotation of the driven pulley 22 and rotates counterclockwise as it revolves about the sun gear 25, as shown in FIGS. 3(a) to 3(d).

Figure 4E:
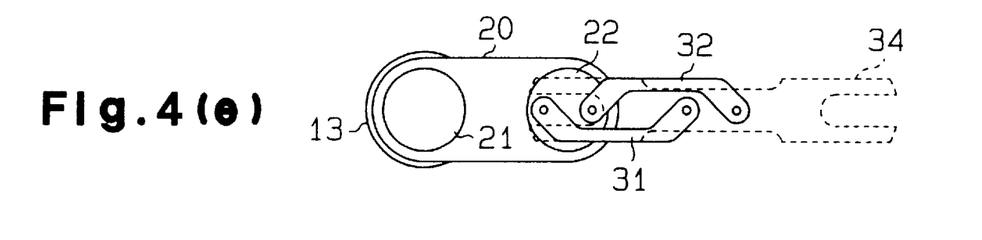

The counterclockwise rotation of the planet gear 28 pivots the drive arm 31 counterclockwise about the first support shaft 26. The drive arm 31 further pivots counterclockwise, as shown in FIGS. 4(a) to 4(d), until the arm 31 is aligned substantially with the first arm 20, as shown in FIG. 4(e). When the drive arm 31 is in the state of FIG. 4(e), the driven arm 32 and the hand 34 are also aligned substantially with the first arm 20. Thus, the hand 34 is translated to the right (as viewed from the perspective of FIG. 4(a)) as shown in FIGS. 4(a) to 4(e).

If the first arm 20 is pivoted 90 degrees in the opposite direction (counterclockwise) from the position shown in FIG. 4(a), the hand 34 is translated to the left from the position shown in FIG. 4(a). The second motor 14 is operated to pivot only the hand 34. The first motor 11 is operated to change the height of the hand 34.

The advantageous effects of the transferring apparatus having the above structure will be described below.

Pivoting of the first arm 20 translates the hand 34 to the left or to the right from the state shown in FIG. 4(a). Thus, the semiconductor wafer 40 may be transferred by placing the wafer 40 on the holding portion 34a of the hand 34.

The parallel linkage mechanism that includes the drive arm 31 and the driven arm 32 is employed to translate the hand 34. In addition, the arms 31, 32, and 34 are flat. This structure decreases the number of belts in comparison with prior art link type robot arms. Furthermore, the entire robot arm may be formed thinner than the prior art link type robot arms. This, in turn, enables the chambers to have smaller openings, through which the drive and driven arms 31, 32 move in and out of. Smaller openings suppress the entrance of dust into the chambers.

The reduction in the number of belts also reduces the number of pulleys. This decreases the number of electromagnetic fluid seals that are used to prevent dust from arising out of the bearing of each pulley. Furthermore, dust that materializes due to the deterioration of the seals is suppressed.

Although only one embodiment of the present invention has been described so far, it should be apparent to those skilled in the art that the present invention may be embodied in many other specific forms without departing from the spirit or scope of the invention. More particularly, the above embodiment may be modified as described below.

The illustrated belts and pulleys may be replaced with sprockets and chains. In other words, the belts may be replaced with other types of known flexible strands, and the word "pulley" is used herein to include sprockets when a chain is used as the flexible strand. Furthermore, the pulleys 21, 22 may be replaced with gears, and an intermediate gear may be meshed with both to achieve the same result.

Figure 10:
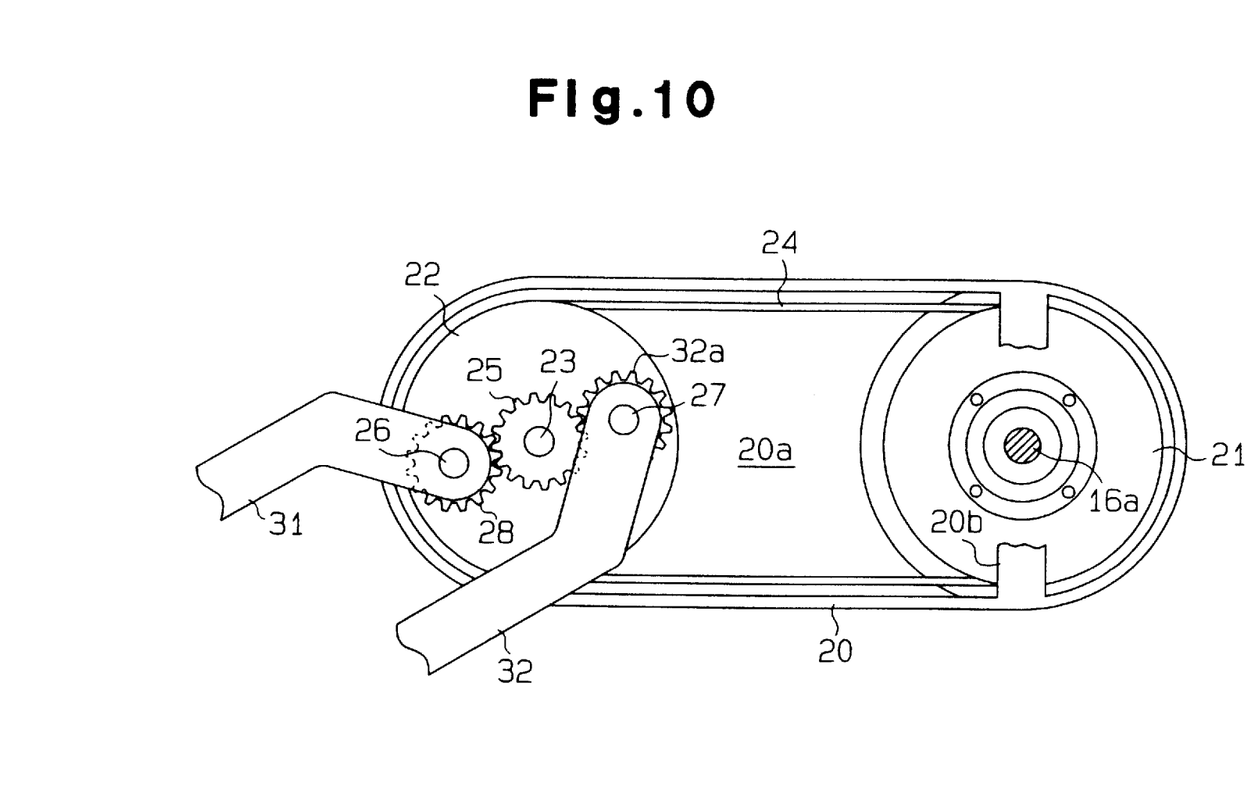
FIG. 10 is a partial plan view showing a further embodiment of a transferring apparatus.

As shown in FIG. 10, the drive arm 32 may be provided with a planet gear 32a that is formed integrally with the proximal end of the drive arm 32. In the same manner as the planet gear 28, the rotation of the driven pulley 22 causes the planet gear 32a to rotate about the sun gear 25 as it revolves. The revolution of the planet gears 28, 32a operates the associated drive and driven arms 31, 32.

The engagement between the driven gear 32a and the sun gear 25 restricts the movement of the driven arm 32. This suppresses chattering of the driven arm 32 and improves the positioning accuracy of the hand 34.

Figure 5A:
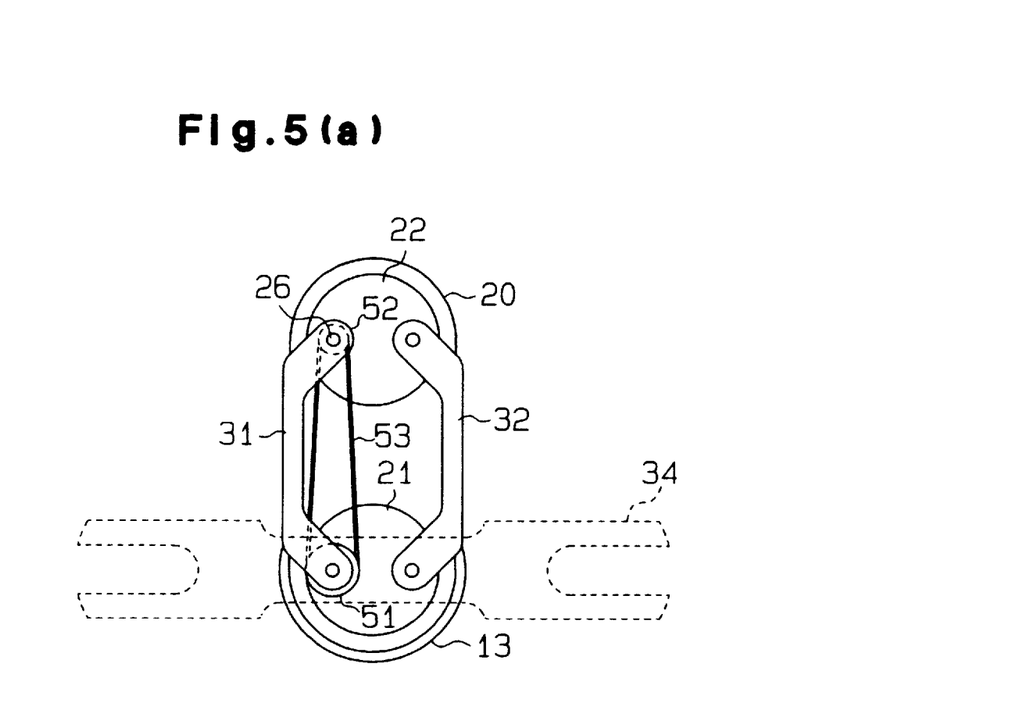
FIGS. 5(a) and 5(b) are diagrammatic views showing a further embodiment of a pivoting mechanism for the second arm.
Figure 5B:
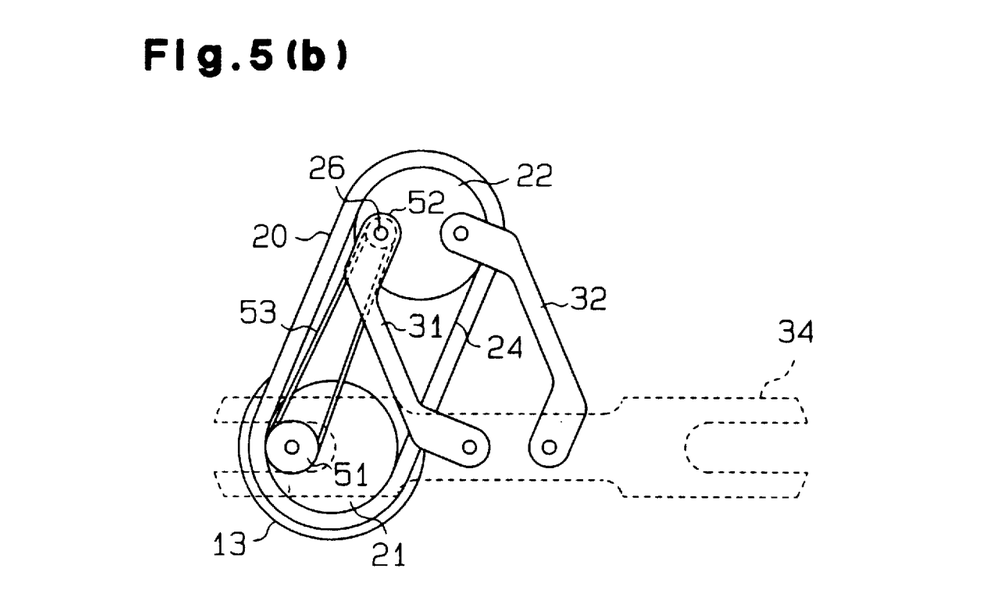

As shown in FIGS. 5(a) and 5(b), first and second auxiliary pulleys 51, 52 and a belt 53 may be employed in lieu of the sun and planet gears 25, 28. In this case, the first auxiliary pulley 51 is fixed to the top surface of the drive pulley 21 at a position that is eccentric to the axis of the pulley 21, as shown in FIGS. 5(a) and 5(b). The second auxiliary pulley 52 is coupled to the first support shaft 26 on the driven pulley 22 and supported to pivot integrally with the drive arm 31. The belt 53 connects the pulleys 51, 52. The speed ratio between the first and second auxiliary pulleys 51, 52 is 2:1.

In the same manner as in the first embodiment, the first arm 20 is pivoted 90 degrees clockwise about the drive pulley 21 without rotating the drive pulley 21. The first auxiliary pulley 51 is maintained at the same position and the second auxiliary pulley 52 revolves clockwise about the first auxiliary pulley 51. The second auxiliary pulley 52 rotates 180 degrees counterclockwise about the first support shaft 26. Thus, the drive arm 31 pivots 180 degrees counterclockwise about the support shaft 26 and the hand 34 is translated. The superior effects of the first embodiment may also be obtained through this structure.

Figure 6:
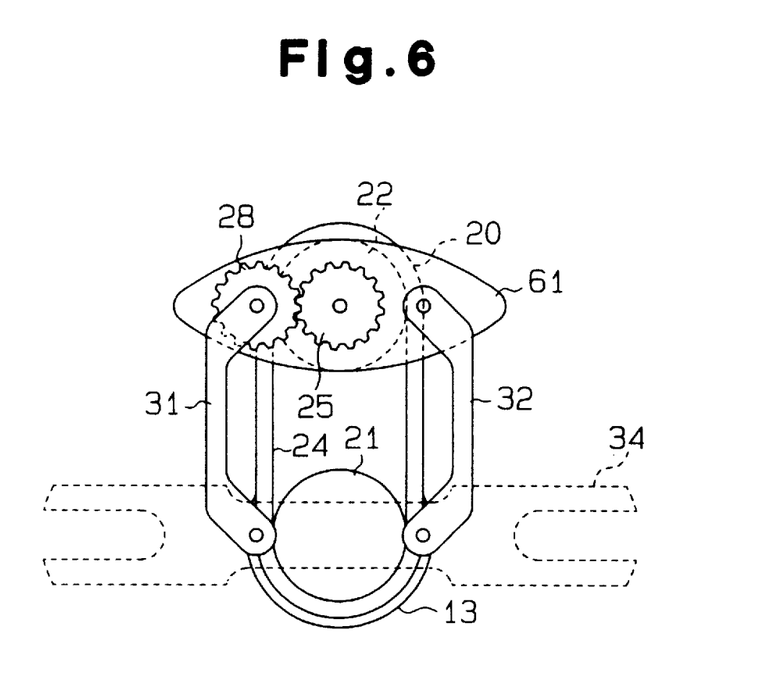
FIG. 6 is a diagrammatic view showing a further embodiment of a pivoting mechanism for the second arm.

In a further embodiment shown in FIG. 6, an elliptical collar 61 is coupled to the top surface of the driven pulley 22 to support sun and planet gears 25, 28, which have diameters larger than that of the corresponding gears 25, 28 employed in the first embodiment. The large diameter of the gears 25, 28 increases the space between the drive and driven arms 31, 32 and allows enlargement of the arms 31, 32 in comparison with the first embodiment. This increases the rigidity of the arms.

Figure 7:
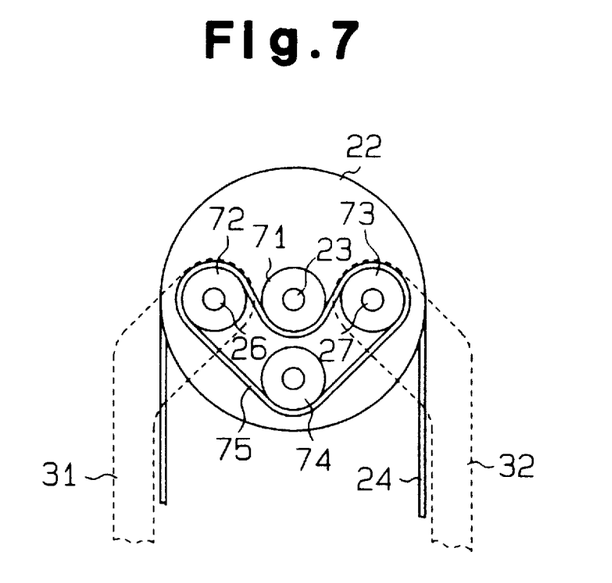
FIG. 7 is a partial plan view showing a further embodiment of a pivoting mechanism for the second arm.

The structure of the pivoting mechanism of the drive arm 31 may be altered as shown in FIG. 7. The illustrated pivoting mechanism includes a first pulley 71, which is fixed to the fixed shaft 23. A second pulley 72 is fixed to the drive arm 31 and rotatably supported by the first support shaft 26. A third pulley 73 is rotatably supported by the second support shaft 27. A tension pulley 74 is rotatably supported on the driven pulley 22. A belt 75 connects the pulleys 71–74.

In this case, the pivoting of the first arm 20 in a certain direction causes the belt 75 to rotate the second pulley 72 in the same manner as in the first embodiment. This enables translation of the hand 34. Accordingly, the advantageous effects obtained in the first embodiment may also be obtained though this embodiment. In this embodiment, the third pulley 73 may be fixed to the driven arm 32.

Figure 8:
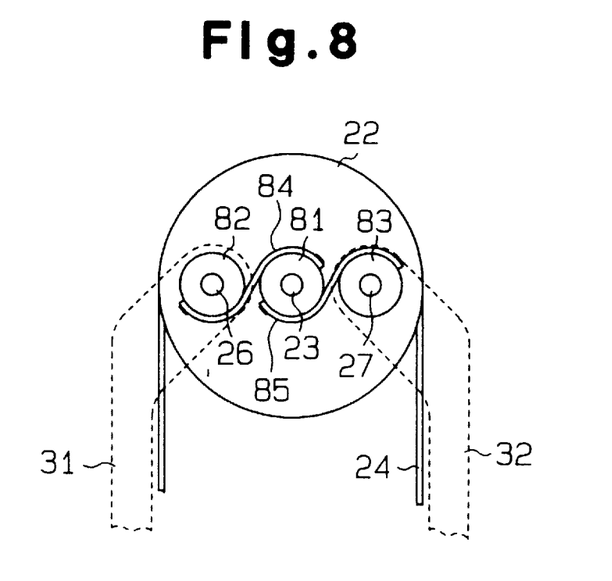
FIG. 8 is a partial plan view showing a further embodiment of a pivoting mechanism for the second arm.

The structure of the pivoting mechanism of the drive arm 31 may also be altered as shown in FIG. 8. In this case, a first pulley 81 is fixed to the fixed shaft 23. A second pulley 82 is fixed to the drive arm 31 and rotatably supported by the first support shaft. A third pulley 83 is fixed to the driven arm 32 and rotatably supported by the second support shaft 27. A first open belt 84 connects first and second pulleys 81, 82. A second open belt 85 connects the first and third pulleys 81, 83.

In this case, the pivoting of the first arm 20 in a certain direction causes the first and second belts 84, 85 to rotate the associated second and third pulleys 82, 83 in the same manner as in the first embodiment. This enables parallel translation of the hand 34. Accordingly, the advantageous effects obtained in the first embodiment may also be obtained though this embodiment. In this embodiment, the third pulley 83 does not necessarily have to be fixed to the driven arm 32. Furthermore, the third pulley 83 and the second open belt 85 may be eliminated.

Figure 9:
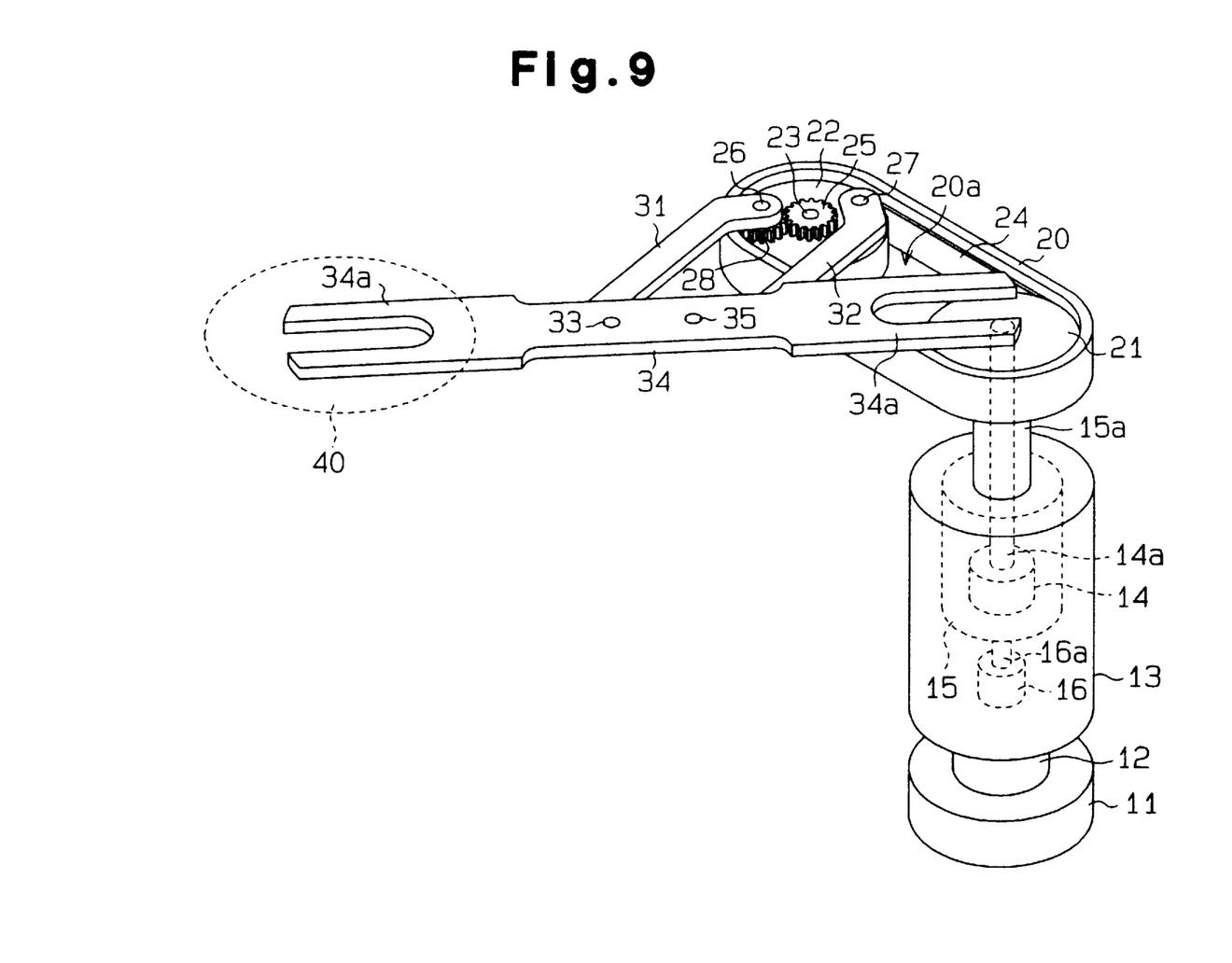
FIG. 9 is a perspective view showing a further embodiment of a transferring apparatus.

In the first embodiment, the second motor 14 is secured inside the outer case 13 while the third motor 16 is secured inside the inner case 15, which is rotated by the second motor 14. However, as shown in FIG. 9, the third motor 16, which drives the arm, may be secured inside the outer case 13 to rotate the inner case 15. The distal end of the cylinder 15a extending from the inner case 15 is fixed to the first arm 20. The second motor 14 employed to drive the pulley is secured inside the inner case 15. The output shaft 14a of the second motor 14 is coupled to the drive pulley 21. The output shaft 14 extends through the cylinder 15a and is rotatable with respect to the tube 15a. In this case, the hand 34 is translated by operating the third motor 16 to pivot the first arm 20 clockwise by 90 degrees while also operating the second motor 14 to rotate the drive pulley 21 counterclockwise by 90 degrees. Accordingly, the advantageous effects obtained in the above embodiments may also be obtained though this embodiment.

The speed ratio between the drive pulley 21 and the driven pulley 22 and between the sun gear 25 and the planet gear 28 is not limited to 1:1 in the above embodiments and may be varied as required. Furthermore, the holding portion 34a of the hand 34 need not be provided on both ends of the hand 34 and may thus be provided on only one end. Liquid crystal substrates may also be transferred by the hand. In other cases, clamping devices may be provided on each end of the hand to transfer various types of machined or assembled components.

Therefore, the present examples and embodiments are to be considered as illustrative and not restrictive and the invention is not to be limited to the details given herein, but may be modified within the scope of the appended claims.

What is claimed is:

1. An apparatus for transferring an article, said apparatus comprising:
    a movable hand for holding the article;
    a first arm having a proximal end and a distal end, wherein the proximal end rotatably supports a rotatable drive member and the distal end rotatably supports a rotatable driven member, said drive member and said driven member being connected to each other by a power transmitting means such that the drive member drives the driven member;
    a second arm and a third arm each having a proximal end and a distal end, wherein the proximal ends of the second and third arms are pivotally supported by the driven member, and the distal ends of the second and third arms are pivotally coupled to the hand, and wherein said driven member, said second arm, and said third arm cooperate with said hand to define a parallel linkage mechanism;
    a first motor connected to said first arm for pivoting the first arm about its proximal end;
    a second motor connected to said drive member for rotating the drive member; and
    a pivoting mechanism interconnecting said drive member, said driven member and said second arm for pivoting the second arm about its proximal end relative to the first arm in correspondence with the pivoting of the first arm.

2. The apparatus according to claim 1, wherein said pivoting mechanism includes:
    a fixed shaft provided on the first arm to rotatably support the driven member;
    a sun gear fixed to the fixed shaft;
    a support shaft provided on the surface of the driven member; and
    a planet gear rotatably supported by the support shaft and fixed to the second arm, wherein said planet gear is meshed with said sun gear.

3. The apparatus according to claim 1, wherein said pivoting mechanism includes:
    a fixed shaft provided on the first arm to rotatably support the driven member;
    a first pulley fixed to the fixed shaft;
    a first support shaft and a second support shaft provided on the surface of the driven member;
    a second pulley and a third pulley rotatably supported by the first support shaft and the second support shaft and provided on the second arm and the third arm, respectively; and
    a flexible strand for connecting the first pulley, the second pulley and the third pulley.

4. The apparatus according to claim 1, wherein said pivoting mechanism includes:
    a first pulley provided on the surface of the drive member;
    a support shaft provided on the surface of the driven member;
    a second pulley rotatably supported by the support shaft and provided on the second arm; and
    a flexible strand for connecting the first pulley and the second pulley.

5. The apparatus according to claim 1, wherein said hand includes an intermediate portion and two end portions, said second arm and third arm being coupled to the intermediate portion, and said end portions each being capable of holding an article.

6. The apparatus according to claim 1 further comprising:
    an inner case for accommodating the first motor that pivots the first arm; and
    an outer case for accommodating the second motor that rotates the drive member and for accommodating the inner case in a manner allowing relative rotation between the outer case and the inner case.

7. The apparatus according to claim 6 further comprising a driving device connected to said outer case for vertically moving the outer case, thereby elevating the hand.

8. The apparatus according to claim 1, wherein said pivoting mechanism includes:
    a fixed shaft provided on the first arm to rotatably support the driven pulley;

a sun gear fixed to the fixed shaft;

a pair of support shafts provided on the surface of the driven member with a predetermined interval therebetween; and first and second planet gears rotatably supported by the pair of support shafts and fixed to the second and third arms, respectively, wherein said planet gears are meshed with said sun gear.

9. The apparatus according to claim 1, wherein the power transmitting means is a flexible strand.

10. The apparatus according to claim 1, wherein the drive member is a pulley, the driven member is a pulley, and the power transmitting means is a belt.

11. A robot arm for transferring an article, said apparatus comprising:

a movable hand for holding the article;

a first arm having a proximal end and a distal end, wherein the proximal end rotatably supports a drive member and the distal end rotatably supports a driven member, said drive member and said driven member being connected to each other by a transmission means such that the drive member drives the driven member;

a second arm and a third arm each having a proximal end and a distal end, wherein the proximal ends of the second and third arms are pivotally supported by the driven member, and the distal ends of the second and third arms are pivotally coupled to the hand, and wherein said driven member, said second arm, and said third arm cooperate with said hand to define a parallel linkage mechanism;

a pivoting mechanism interconnecting said drive member, said driven member and said second arm for pivoting the second arm about its proximal end relative to the first arm in correspondence with the pivoting of the first arm.

12. The robot arm according to claim 11, wherein said pivoting mechanism includes:

a fixed shaft provided on the first arm to rotatably support the driven member;

a drive gear fixed to the fixed shaft;

a support shaft provided on the surface of the driven member; and a driven gear rotatably supported by the support shaft and fixed to the second arm, wherein said driven gear is meshed with said drive gear.

13. The robot arm according to claim 11, wherein said pivoting mechanism includes:

a fixed shaft provided on the first arm to rotatably support the driven member;

a first pulley fixed to the fixed shaft;

a first support shaft and a second support shaft provided on the surface of the driven member;

a second pulley and a third pulley rotatably supported by the first support shaft and the second support shaft and provided on the second arm and the fixed third arm, respectively; and a first flexible strand for connecting the first pulley and the second pulley and a second flexible strand for connecting the first pulley and the third pulley.

14. The robot arm according to claim 11, wherein said pivoting mechanism includes:

a first pulley provided on the surface of the drive member;

a support shaft provided on the surface of the driven member;

a second pulley rotatably supported by the support shaft and provided on the second arm; and a flexible strand for connecting the first pulley and the second pulley.

15. The robot arm according to claim 11, wherein said hand includes an intermediate portion and two end portions, said second arm and third arm being coupled to the intermediate portion, and said end portions being capable of holding an article.

16. The robot arm according to claim 11, wherein the transmission means is a flexible strand.

17. The robot arm according to claim 11, wherein the drive member is a pulley, the driven member is a pulley, and the transmission means is a belt.

* * * * *